Figure 1:
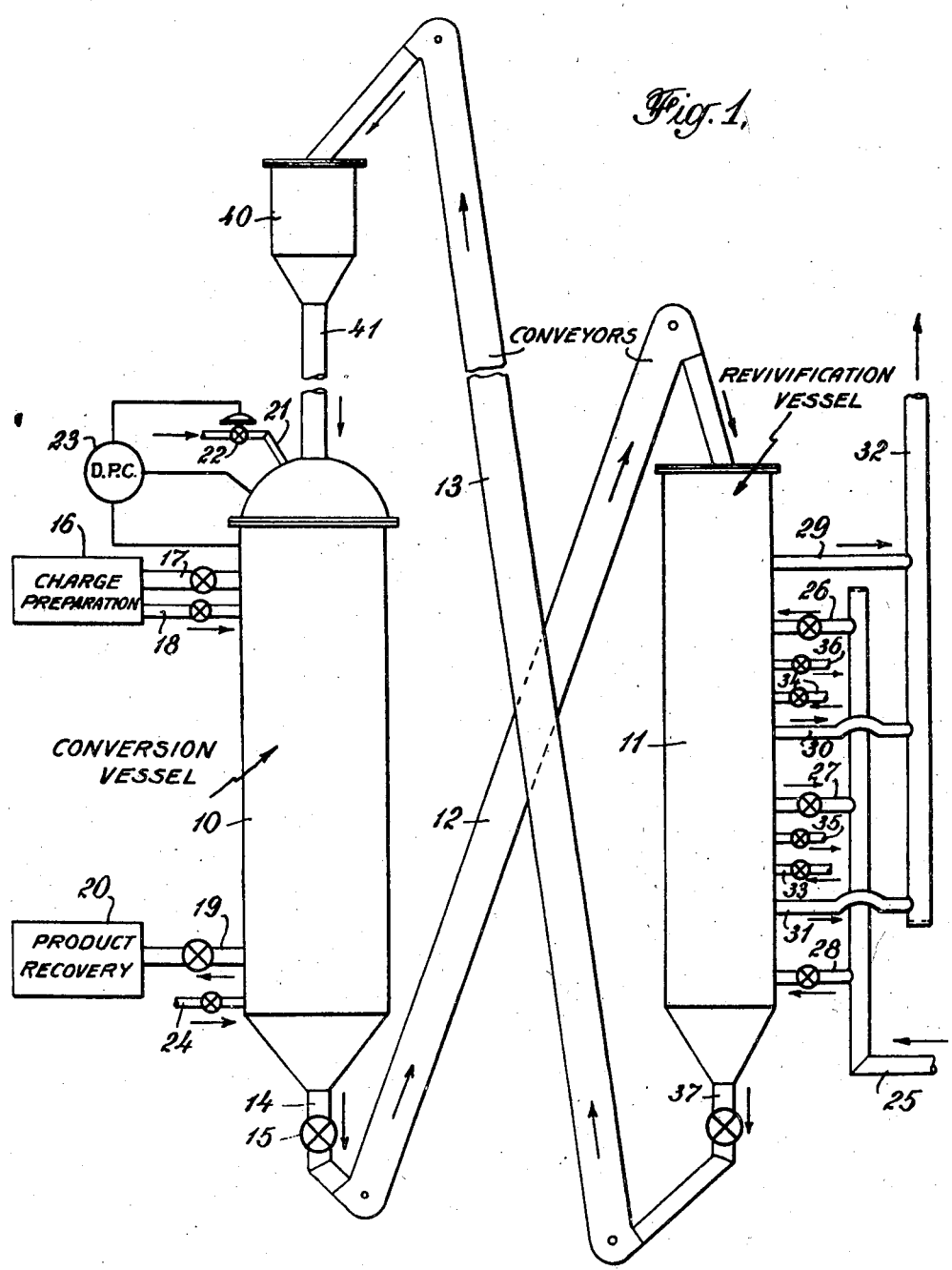

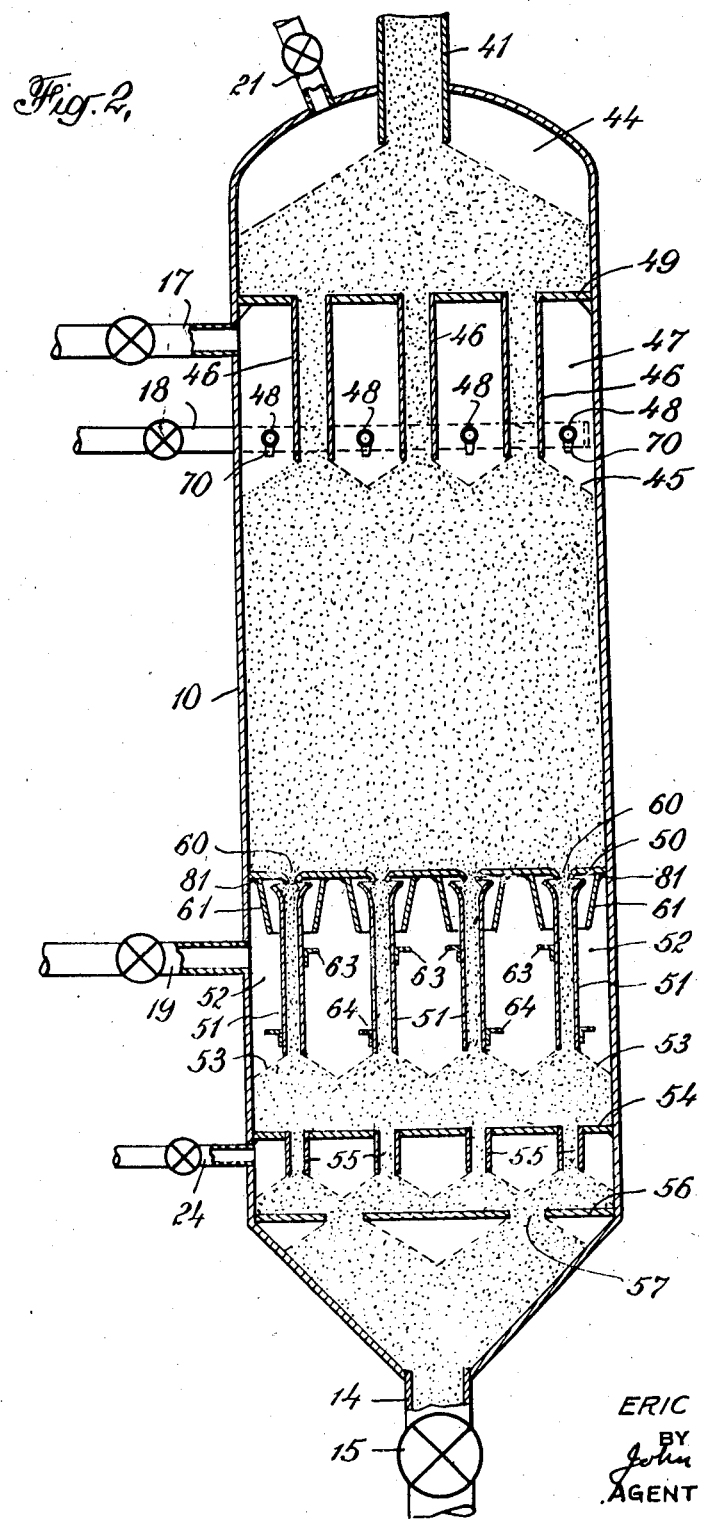

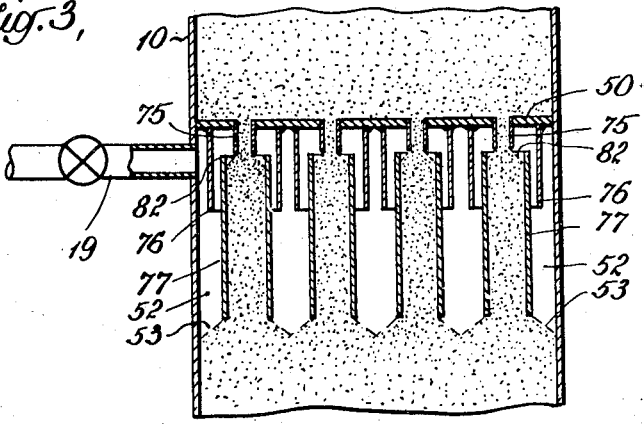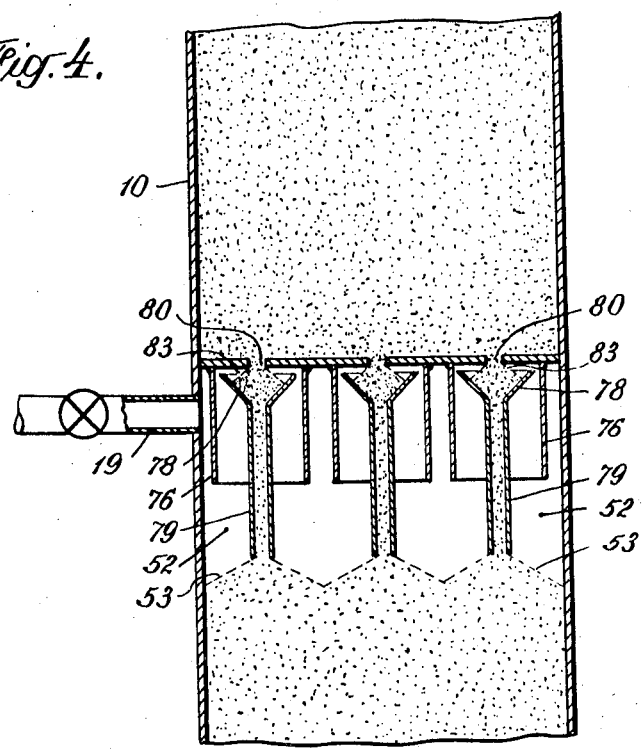

Patented Jan. 11, 1949

2,458,499

UNITED STATES PATENT OFFICE 2,458,499

METHOD AND APPARATUS FOR CONVERSION OF FLUID HYDROCARBONS

Eric V. Bergstrom, Short Hills, N. J., assignor to Socony-Vacuum Oil Company, Incorporated, a corporation of New York Application September 13, 1946, Serial No. 696,856

11 Claims. (Cl. 196—52)

This invention has to do with a method and apparatus for conversion of fluid hydrocarbons in the presence of a particle-form solid contact material which may or may not be catalytic in nature.

Exemplary of the processes to which this invention may be applied are the catalytic cracking conversion of high boiling fluid hydrocarbons, the catalytic hydrogenation, dehydrogenation, aromatization, polymerization, alkylation, isomerization, reforming, treating or desulfurizing of selected hydrocarbon fractions. Also exemplary are the thermal cracking, viscosity breaking and coking of hydrocarbon fractions in the presence of heated, inert, solid material.

Typical of such processes is the catalytic cracking conversion of hydrocarbons, it being well known that high boiling fluid hydrocarbons may be converted to lower boiling gaseous, gasoline containing hydrocarbon products by exposure to a suitable adsorbent type catalytic material at temperatures of the order of about 800° F. and higher and at pressures usually above atmospheric. Such a process has recently been developed commercially into a continuous cyclic process wherein the solid catalyst is passed cyclically through a conversion zone wherein it is contacted with fluid hydrocarbons to effect the conversion thereof and through a regeneration zone wherein it is contacted with a combustion supporting gas such as air which acts to burn off from the catalyst a carbonaceous contaminant deposited thereon in the conversion zone.

This invention is particularly concerned with such cyclic conversion processes or gas-solid contacting processes wherein the particle-form contact material moves through the conversion zone or contacting zone as a substantially compact column and wherein gaseous reaction products or contacting gas and the used contact material are separately withdrawn from the conversion or contacting zone.

In such cyclic processes wherein the contact material is a catalyst it may partake of the nature of natural or treated clays, bauxite, inert carriers upon which catalytic materials such as metallic oxides have been deposited or certain synthetic associations of silica, alumina or silica and alumina to which small amounts of other materials such as metallic oxides may be added for special purposes. In processes wherein the contact material is not catalytic in nature its purpose is usually that of a heat carrier and may take any of a number of forms, for example spheres or particles of metals, stones or refractory materials such as mullite, zirkite, or corhart material. In order to permit practical rates of gas flow through the contact material which is maintained as a substantially compact column in the conversion zone, the contact material should be made up of particles falling within the size range of about 3 to 100 mesh and preferably 4 to 20 mesh by Tyler standard screen analysis.

In such processes wherein the direction of gas flow through the reaction zone is countercurrent to the downward flow of the contact material, the maximum rate of gas flow should be limited to that which will not cause "boiling of the contact material" or serious interference with its flow otherwise serious difficulties arise such as channeling of the solid and gas flow and excessive attrition of the solid material. In many processes such as, for example the conversion of liquid hydrocarbons to lower boiling gaseous products it is desirable to pass the reactant fluid downwardly through the conversion zone concurrently with the contact material flow. In such processes a serious difficulty arises in the withdrawal of gaseous reactants from the contact material column within the conversion zone without serious entrainment of particles of contact material in the effluent gaseous stream.

A major object of this invention is the provision in a process wherein a gaseous material is contacted with a substantially compact column of particle-form contact material of an improved method and apparatus for withdrawal of gas from said column without substantial entrainment of contact material particles.

Another object of this invention is the provision of an improved method and apparatus for conversion of a high boiling fluid hydrocarbon to a lower boiling gaseous hydrocarbon product in a confined zone in the presence of a substantially compact column of contact material particles flowing downwardly through said zone in the direction of the reactant flow.

A specific object is the provision in a hydrocarbon conversion process wherein the contact material moves downwardly as a substantially compact column of solid particles concurrently to the fluid reactant flow of a practical method and apparatus for withdrawal of gaseous conversion products from said column in the conversion zone without substantial entrainment of contact material particles in the effluent gas stream.

These and other objects of this invention will become apparent from the following detailed description of the invention. Before proceeding with the description certain expressions employed herein in describing and in claiming this invention will be defined. The term "gaseous," as used herein, unless specifically otherwise modified, is intended broadly to cover material existing in the gaseous phase under the particular operating conditions involved regardless of what may be the normal phase of that material under ordinary atmospheric conditions. The expression "contact material," unless otherwise specifically modified, is used herein in a broad sense to cover any solid material having suitable heat carrying and stability properties for the particular process application in which it is employed, and the expression is intended to broadly cover catalytic and non-catalytic materials.

The invention may be most readily understood by reference to the drawings attached hereto of which Figure 1 is an elevational view of an arrangement of a cyclic conversion system to which this invention is applied, Figure 2 is an elevational view, partially in section of a conversion vessel constructed according to this invention, Figure 3 is a vertical view, partially in section, of a portion of a reaction vessel in which is provided a modified form of this invention and Figure 4 is a similar view of another modified form of the invention. All of these drawings are highly diagrammatic in form.

Turning now to Figure 1, there is shown a conversion vessel 10, a regeneration or revivification vessel 11 and conveyors 12 and 13 for transfer of contact material between the conversion and regeneration vessels. In operation particle-form contact material is supplied from hopper 40 through gravity feed leg 41 into the upper section of the conversion vessel 10. Used contact material is withdrawn from the lower end of vessel 10 through drain conduit 14. The rate of contact material flow is controlled by valve 15 on conduit 14 so that a substantially compact column of contact material is maintained within the conversion zone. The hydrocarbon charge to vessel 10 may exist in the gaseous phase or liquid phase or both. The charge may be vaporized and/or heated and separated into vapor and liquid fractions in a suitable charge preparation system 16 which may be of conventional design. Heated charge vapors may be admitted to the upper section of the conversion zone through conduit 17 and heated liquid charge may be admitted through conduit 18. Gaseous conversion products are withdrawn separately of the contact material, from the lower section of the conversion zone through conduit 19 through which it passes to a conventional product recovery system 20. An inert seal gas such as steam or flue gas may be admitted through conduit 21 into a seal zone maintained at the upper end of vessel 10 for the purpose of preventing hydrocarbon escape through the gravity feed leg. The rate of seal gas introduction may be so controlled by means of diaphragm actuated valve 22 and differential pressure control instrument 23 as to maintain a seal gas pressure in the seal zone slightly above the hydrocarbon pressure in the upper section of the conversion zone. An inert purge gas such as steam or flue gas may be introduced into the contact material column through conduit 24 below the level of gaseous reactant withdrawal for the purpose of purging gaseous reaction products from the outflowing used contact material. The used contact material is transferred by conveyor 12, which may be a continuous bucket elevator for example, to the upper end of revivification vessel or regeneration vessel 11. The regeneration vessel shown is of the multi-stage type well adapted for the regeneration of spent cracking catalysts. Air or oxygen containing gas is introduced from manifold 25 into several superposed burning stages through inlet conduits 26, 27 and 28. Flue gas may be withdrawn from these stages through conduits 29, 30, and 31, all connecting into outlet manifold 32. The contact material temperature may be controlled by passing a suitable cooling fluid through cooling tubes located in vessel 11 between the burning stages. Cooling fluid may be introduced into the cooling tubes (not shown) through communicating inlets 33 and 34 and withdrawn therefrom through communicating outlets 35 and 36. Regenerated contact material is withdrawn from vessel 11 through drain conduit 37 through which it passes to conveyor 13. The hot regenerated contact material is transferred by conveyor 13 to reactor supply hopper 40. While the regenerator described hereinabove is of the multi-stage type, it will be understood that other types of regenerators adapted for regenerating contact materials may be employed within the scope of this invention. The type of regenerator or revivification vessel to be employed will vary depending upon the particular process involved. Any apparatus adapted to condition the contact material to a state satisfactory for re-use in the particular conversion process involved is contemplated to be within the scope of this invention. It should be further understood that this invention is not considered as limited to any particular positional arrangement of conversion and regeneration vessels or to the particular apparatus described hereinabove for contact material introduction into the conversion vessel.

The improvement of this invention as applied to the conversion vessel 10 is shown in Figure 2 wherein 10 is the conversion vessel having solid inlet 41 at its upper end and outlet 14 at its lower end. A partition 43 is positioned across the upper section of the vessel 10 to provide a seal chamber 44 in the upper end of vessel 10. Contact material passes from seal chamber 44 onto the surface of the contact material column 45 in the conversion chamber therebelow through uniformly distributed tubes 46 which depend from partition 43. The partition 43 and tubes 46 combine to provide a gas distribution space 47 above the contact material column in the conversion chamber. Vaporized hydrocarbons may be introduced into the gas space through conduit 17. A plurality of tubes 48 are positioned across the vessel within the gas space 47. These tubes are closed on one end which terminates within the vessel and connect on their opposite ends into the externally positioned inlet manifold 18. A number of spaced apart spray devices 70 are connected along each tube 48. These spray devices are adapted to spray liquid oil onto the surface of the column 45.

A partition 50 is positioned across the lower section of the vessel. A plurality of depressed, spaced openings 60 are distributed substantially uniformly over the horizontal cross-sectional area of the partition. A plurality of substantially vertical tubes 51 are positioned within the vessel 10 below partition 50, one tube being symmetrically positioned below each aperture. The tubes may be supported from the vessel shell by means of angle irons 63 and 64. The tubes 51 are flared outwardly on their upper ends, the flared ends being of substantially greater horizontal cross-sectional area than the openings 60, so that a depressed portion of the opening 60 protrudes into the flared portion of the tube 51 spaced therebelow. A shield 61 is fastened to the underside of partition 50 so as to depend vertically downward therefrom in concentric relationship to each tube 51. The shield may be of cylindrical form or its side walls may preferably curve inwardly towards the tube which they surround. The shields 61 terminate substantially short of the lower ends of tubes 51 and they are of substantially greater horizontal area than the tubes 51 so as to provide between each tube and each shield a vertical passage for gas flow which communicates at its upper end with the open upper end of a tube 51. A conduit 19 connects into the vessel shell at the level of the gas space 52 formed by means of the partition 50 and tubes 51. Spaced partitions 54 and 57 are positioned at intervals across the vessel 10 a spaced distance below the lower ends of tubes 51. Two spaced concentric circular rows of tubes 55 extend through and depend from partition 54 and a single circular row of orifices 56 is provided in partition 57. The orifices 56 are horizontally staggered with respect to tubes 55. The arrangement is such that a plurality of streams of contact material may be withdrawn from the bottom of bed 53 through tubes 55 which are substantially uniformly distributed across the horizontal cross-sectional area of vessel 10 and of bed 53. The streams from tubes 55 are proportionately merged into a smaller number of streams passing through orifices 56 in partition 57 and the streams from orifices 56 are proportionately merged into a single discharge stream in conduit 14. As a result, contact material may be uniformly withdrawn from all portions of the horizontal cross-sectional area of bed 53. If desired, orifices in partition 54 may be substituted for the tubes 55 therein or tubes may be fitted in the orifices 56 in partition 57. The number of partitions such as 54 and 57 required depends upon the vessel diameter, the number of partitions increasing with increasing diameter of vessel and the number of orifices in each successive partition upward being progressively greater.

In operation contact material enters the seal chamber 44 through conduit 40 and passes from the bottom of the seal chamber through tubes 46 onto the surface of the contact material column 45 in the conversion chamber. The contact material flows downwardly through an upper portion of the conversion chamber as a substantially compact bed or column of gravity flowing particles. The rate of solid flow is controlled by throttling by means of valve 15 on the outlet 14 from vessel 10. Contact material passes from the bottom of the column 45 through the depressed openings 60 into the flared upper ends of tubes 51. The contact material passes downwardly through tubes 51 onto the surface of bed 53 from which it is withdrawn uniformly as described hereinabove. The rate of solid withdrawal is throttled by valve 15 so that continuity of substantially compact body of contact material from the level of valve 15 upwardly through the entire vessel 10 to inlet leg 40 is insured. Vaporized hydrocarbon charge may be introduced into space 47 in the upper section of vessel 10 through conduit 17. Heated liquid charge may be introduced through manifold 17 to tubes 48 and spray devices 70. The hydrocarbon charge may be all liquid, all vapor or partially liquid and vapor. The fluid hydrocarbon charge passes downwardly within the column 45 wherein it is converted to lower boiling gaseous products. These gaseous products pass from the bottom of column 45 through depressed openings 60 along with and through the contact material streams. The gaseous products become disengaged from the contact material streams substantially at the point of delivery of said streams from openings 60 into the flared tubes 51, i. e., at the location of abrupt expansion of the horizontal dimensions of the contact material streams. The disengaged gaseous products along with any entrained solid particles pass upwardly from the disengaging surface over the upper ends of tubes 51 and then downwardly in the space between tubes 51 and shields 61. The gaseous products and entrained solids are thus directed downwardly into gas space 52 towards the bed of contact material 53 so as to cause entrained solid particles to settle onto the bed 53. The gaseous products, substantially free of entrained contact material particles are withdrawn from the upper section of space 52 through conduit 19. If desired, several outlets such as 19 may be provided at intervals around the gas space 52.

Turning now to Figure 3, there is shown a somewhat modified form of the invention, identical members in Figures 2 and 3 bearing like numerals. The apparatus of Figure 3 differs from that shown in Figure 2 in that short nipples 75 are substituted in partition 50 for the depressed openings in the same partition in Figure 1. Also shields 76 having strictly vertical side walls are substituted for shields 61 of Figure 2 which are curved inwardly towards the tubes 51. A further difference lies in the provision of single tubes 77 which are substantially greater horizontal dimensions all along their lengths than the nipples 75 in place of the flared tubes 51 of Figure 2.

Still another modification of the invention is shown in Figure 4 which differs from the modification of Figure 3 in that simple orifices 80 are provided in partition 50 in place of tubes 75 and that in place of the tube 77 of Figure 3 or flared tubes 51 of Figure 2, there is provided below each orifice 80 a receiving basin 78 and a vertical drain conduit 79 depending from the bottom of each basin. The shield 76 in Figure 4 is substantially the same as shield 76 in Figure 3.

It will be noted that in all the above modifications of the invention there is provided just below the partition 50 a substantial exposed stream surface of upward disengagement of gas from the solid stream. This disengaging surface is provided in every case by a sudden expansion of the horizontal dimension of the compact contact material streams and the exposure of the location of expansion to a gas space from which direct gravity flow of the contact material from the column, streams or bed is excluded. This disengagement surface is shown by dotted lines at 81, 82 and 83 in Figures 2, 3 and 4 respectively. Moreover, in every modification of the invention there is provided a passage through which the disengaged gas is directed at a relatively high velocity downwardly into a gas collecting space 52 in the direction of a bed of contact material therebelow so as to cause settling of entrained solid particles onto the bed.

The horizontal cross-sectional shape of the openings 60, tubes 51 and shields 61 of Figure 2, or of nipples 75, tubes 77 and shields 76 of Figure 3 or of orifices 80, basins 78, tubes 79 and shields 76 of Figure 4 may vary. In circular vessels it is generally preferable that the shape of the above elements be either circular or square. In any case the maximum horizontal dimensions of all of said elements should be less in every direction than the corresponding dimensions of vessel 10 in order to insure provision of a single continuous settling zone or space 52. The dimensions of the several elements of this invention may vary widely dependinging upon the particular process application for which the invention is used. In general, the openings through the partition 50 and the tubes below said openings should be of such size and number as to permit the maximum anticipated solid flow therethrough. Since the amount of solid gas disengaging surface area is largely dependent upon the relative size of the openings in partition 50 and of the basin or of the expanded portion of the tube below the openings, it is important that the basin or expanded portion of the tube below the openings in partition 50 should be of substantially greater horizontal dimensions than the openings in partition 50. The tubes for solid flow through the gas space 52 should be at least long enough to provide a gas space 52 of about 24 to 36 inches vertical height. The height of the gas space is partially dependent, of course, on the relative amount of the total vessel area taken up by the solid flow tubes, for example, tubes 51 in Figure 2. The height of the gas space 52 should be such as to provide a total gas space volume sufficiently great that the velocity of the gas flow towards outlet or outlets 19 is below that which would entrain the solid particles involved.

The method and apparatus of this invention may be employed in a wide variety of processes involving contact of gas with a column of particle-form solid material. The invention is particularly applicable to catalytic processes for the cracking conversion of liquid or vaporous hydrocarbon charges or both. In general such hydrocarbon conversion operations are conducted under temperatures within the range about 800° F. to 1100° F. Low pressures of the order of 5 to 30 pounds per square inch are generally employed in the conversion zone for cracking conversions. The oil charge space velocity may vary from about 0.3 to 10.0 volumes of oil (measured as liquid at 60° F.) per hour per volume of catalyst column within the reaction zone. The catalyst to oil throughput ratio may vary within the range about 1 to 20 parts of catalyst per part of oil by weight. In general the reactant charge is preheated to a temperature of the order of 600° F.–900° F. and all or part of the heat required for the conversion may be carried into the conversion zone in the catalyst.

It should be understood that the particular details of apparatus construction and of operation and the examples of application of this invention given hereinabove are intended as exemplary and are not to be construed as limiting the scope of this invention except as it may be limited by the following claims.

I claim:
1. A method for conversion of fluid hydrocarbons in the presence of a particle-form contact mass material which comprises: introducing particle-form contact material into the upper section of a confined conversion zone and passing it downwardly within said zone as a substantially compact column, introducing fluid hydrocarbons into said zone to contact said contact material so as to be converted to gaseous hydrocarbon products, flowing contact material from the lower section of said conversion zone as a plurality of spaced downwardly extending streams onto an equal plurality of limited accumulations of downwardly flowing contact material maintained in the upper portion of a second confined zone below said conversion zone, said accumulations serving to throttle the flow of contact material from said streams and said accumulations having a total cross-sectional area at their broadest plane substantially less than that of said second confined zone, flowing the contact material from the bottom of each of said accumulations as at least one confined elongated, downwardly extending, substantially compact stream onto the surface of a bed of said contact material maintained in the lower portion of said second zone so as to provide a substantial gas space surrounding said accumulations and the confined streams therefrom above said bed, withdrawing used contact material from said bed at a controlled rate, flowing gaseous conversion products from the lower section of said conversion zone along with said streams of contact material delivering onto said accumulations and disengaging said gaseous products from the contact material substantially at the location of contact material delivery from said streams onto said accumulations, directing the disengaged gaseous products downwardly in said gas space in said second zone toward the surface of said bed of contact material in said second zone so as to cause any entrained solid particles to settle onto said bed and withdrawing gaseous conversion products from said gas space above said bed.

2. The method for conversion of fluid hydrocarbons in the presence of a particle-form solid contact material which comprises: introducing particle-form contact material at a temperature suitable for said hydrocarbon conversion into the upper section of a confined conversion zone and passing it downwardly within said zone as a substantially compact column, passing said contact material from the lower section of said conversion zone as a plurality of spaced substantially compact streams downwardly into a confined separation zone, expanding the cross-sectional size of said streams in the upper section of said separation zone and directing the expanded streams as compact, confined, spaced streams downwardly through a substantial portion of the length of said separation zone onto the surface of a substantially compact bed of said contact material maintained in a lower portion of said separation zone so as to provide a gas space surrounding said confined streams above said bed, withdrawing used contact material from said bed at a controlled rate, introducing a fluid hydrocarbon charge into said conversion zone and passing said charge downwardly within said column to effect conversion of said charge to gaseous hydrocarbon conversion products, withdrawing said gaseous products from said conversion zone by passing said gaseous products downwardly through said plurality of spaced streams of contact material into the upper section of said separation zone, upwardly disengaging said gaseous products from said contact material in said streams substantially at the location of their expansion in size, directing the disengaged gaseous products downwardly within said gas space within said separation zone towards the surface of said bed therein so as to cause settling of entrained solid particles onto said bed and substantially separately withdrawing gaseous conversion products from said gas space.

3. The method for conversion of fluid hydrocarbons in the presence of a particle-form contact mass material which comprises: maintaining a substantially compact column of particle-form contact material within a confined conversion zone, maintaining a substantially compact bed of said contact material in a confined separation zone below said conversion zone and maintaining a substantial gas space above said bed in said separation zone, maintaining a plurality of uniformly spaced substantially vertical compact, confined columns of said contact material extending upwardly from said bed in said separation zone to a level near but below the upper end of said separation zone, said columns being open on their upper ends to said gas space within said separation zone, supplying particle-form contact material at a suitable temperature for said hydrocarbon conversion onto the upper end of said column within said conversion zone, withdrawing used contact material from the bottom of said column as a plurality of uniformly spaced, substantially compact, downwardly extending streams, said streams being equal in number to said vertical confined columns within said separation zone and being of substantially less horizontal dimensions than said columns directing one of said streams from said conversion zone onto the upper end of each of said columns within said separation zone, withdrawing contact material from said bed in said separation zone at a rate controlled to maintain continuity of substantially compact contact material body upwardly through said bed, columns and streams to the column of contact material in said conversion zone, introducing fluid hydrocarbon reactant into the upper section of said conversion zone, passing said hydrocarbon reactant downwardly through said column within said conversion zone to effect its conversion to gaseous hydrocarbon products, passing gaseous conversion products from the bottom of said column in said conversion zone through said plurality of contact material streams flowing onto said columns in said separation zone, upwardly disengaging said gaseous products from the contact material substantially at the upper ends of said columns within said separation zone, flowing the disengaged gaseous products and any entrained contact material particles downwardly through said gas space toward the surface of said bed within said separation zone so as to cause entrained solid particles to settle onto said bed and substantially separately withdrawing said gaseous products from gas space in said separation zone.

4. A method for conversion of high boiling fluid hydrocarbons to lower boiling gaseous hydrocarbon products in the presence of a moving particle-form contact material maintained at a suitable conversion temperature which method comprises: introducing active particle-form contact material at a suitable temperature for said hydrocarbon conversion into the upper section of a confined conversion zone, passing said contact material downwardly within said zone as a substantially compact column, passing used contact material from the bottom of said conversion zone as a plurality of substantially compact streams uniformly distributed across the bottom of said zone downwardly into the upper section of a confined separation zone below said conversion zone, abruptly expanding the cross-sectional area of said streams at a level within the upper section of said separation zone and exposing the location of expansion of each stream to the interior of said separation zone, directing the expanded streams as compact confined, spaced streams of substantially smaller horizontal dimensions than said separation zone downwardly through a substantial vertical section of said separation zone onto the surface of a substantially compact bed of said contact material maintained within a lower portion of said separation zone so as to provide a gas space for solid particle settling surrounding said confined streams within the upper portion of said separation zone, withdrawing contact material from the bottom of said bed substantially uniformly from all portions of its horizontal cross-sectional area at a rate limited to insure continuity of substantially compact contact material body upwardly from said bed through said column within said conversion zone, introducing a high boiling fluid hydrocarbon charge into the upper section of said conversion zone, passing said hydrocarbon charge downwardly within said column to effect conversion of said charge to lower boiling gaseous hydrocarbon products, passing said gaseous products downwardly through said plurality of streams of contact material into the upper section of said separation zone, upwardly disengaging said gaseous products from the contact material streams substantially at the locations of their expansion, directing the flow of disengaged gaseous products and any entrained contact material particles downwardly within said gas space towards the bed of contact material in said separation zone so as to cause the entrained particles to settle onto said bed, and withdrawing gaseous products substantially free of solid particles from the upper portion of said gas space within said separation zone.

5. An apparatus for conversion of fluid hydrocarbons in the presence of a moving mass of particle-form contact material which comprises: means defining a confined conversion chamber adapted to confine gaseous material and a substantially compact column of particle-form contact material, means to introduce particle-form contact material into the upper section of said chamber, means to introduce fluid hydrocarbons into said chamber, a partition across said chamber intermediate its ends, a plurality of uniformly distributed apertures in said partition, a substantially vertical tube having an enlargement on its upper end positioned within said chamber symmetrically below each aperture in said partition, the enlargement on the upper end of each tube being spaced below the partition and being substantially larger in cross-sectional area than the aperture in the partition thereabove so as to prevent overflow of solid particles from said aperture over the open upper end of said enlargement and the lower end of each tube being open and spaced a substantial vertical distance below the level of said partition so as to provide a substantial gas space in said chamber below said partition from which gravity flow of solid material from the column in said chamber is excluded, a plurality of spaced baffle means depending from said partition and terminating substantially above the level of the lower ends of said tubes, each of said baffle means being adapted to surround an upper portion of the length of one of said tubes and being of substantially greater cross-sectional area than said tube so as to provide a substantially vertical passage for gas flow between said baffle means and said tube, means to withdraw gas from said gas space below said partition and means to withdraw solid material from the lower section of said chamber.

6. In a gas-solid contacting vessel wherein gaseous material is contacted with a substantially compact bed of particle-form solid contact material the improved means for separate withdrawal of said gas from under the surface of said bed in said contacting vessel which comprises in combination: means defining a partition across said vessel in the portion thereof occupied by said bed, said partition having a plurality of apertures therein spaced substantially uniformly across the cross-sectional area thereof, a plurality of spaced, substantially vertical tubes positioned within said vessel, one tube spaced a short distance below each aperture, each tube being enlarged on its open upper end so as to enclose a horizontal cross-sectional area substantially larger than that of the aperture thereabove, a plurality of surrounding shields depending from said partition, one of such shields surrounding an upper portion of the length of each tube in such a manner as to leave a vertical gas passage between the tube and the shield which passage communicates with the enlarged, open upper end of said tube, and conduit means for gas withdrawal connected into the vessel shell at a level below said partition and above the lower ends of said tubes.

7. An apparatus for conversion of fluid hydrocarbons in the presence of a substantially compact column of particle-form contact material which comprises in combination: a substantially vertical conversion vessel adapted to confine a substantially compact column of contact material and a gaseous material, means to introduce particle-form contact material into the upper section of said vessel, means to introduce fluid hydrocarbon reactant into said vessel, means to withdraw contact material from the lower section of said vessel, a partition across the lower section of said vessel substantially above said withdrawal means, said partition having a plurality of uniformly spaced apertures therein, a plurality of basins positioned a spaced distance below said partition, one basin below each aperture, each basin being of substantially greater horizontal cross-sectional area than the aperture thereabove and being so positioned with respect to said aperture as to prevent solid overflow over the upper edge of the basin, conduit means extending downwardly from each basin for flow of solid material from the basin to a level in the vessel therebelow, around each basin a substantially vertical shield wall depending from said partition and extending downwardly past the basin but terminating short of the lower ends of said conduits, each of said shields being adapted to enclose a substantially greater horizontal cross-sectional area than that of the basin it surrounds at its widest plane so as to provide a vertical passage for gas flow between the basin and the shield and between the tube and the shield which space communicates on its upper end with the open end of said basin, said shields being spaced apart and being of smaller horizontal dimensions in every direction than said vessel so as to provide a single gas space between said shields, and conduit means connecting from the outside into the shell of said vessel below the level of said partition and above the lower ends of said tubes.

8. An apparatus for conversion of fluid hydrocarbons in the presence of a substantially compact column of particle-form contact material which comprises in combination: a substantially vertical conversion vessel adapted to confine a substantially compact column of contact material and a gaseous material, means to introduce particle-form contact material into the upper section of said vessel, means to introduce fluid hydrocarbon reactant into said vessel, means to withdraw contact material from the lower section of said vessel, a partition across the lower section of said vessel substantially above said withdrawal means, a plurality of downwardly depressed openings in said partition spaced substantially uniformly across its horizontal cross-sectional area, a plurality of tubes positioned substantially vertically below said partition within said vessel, one symmetrically below each of said openings, said tubes having outwardly flared, open, upper ends of substantially greater size than said depressed openings terminating shortly below said partition so that the depressed openings in said partition protrude within the flared upper ends of said tubes, a plurality of nipples of greater horizontal dimensions than the flared ends of said tubes extending downwardly from the underside of said partition to a level short of the lower ends of said tubes, one of said nipples being concentrically positioned around each tube so as to provide a substantially vertical passage for gas flow communicating at its upper end with the open flared upper end of said tube, and means to withdraw gas from said vessel at a level below said partition but above the lower ends of said tubes.

9. An apparatus for conversion of fluid hydrocarbons in the presence of a substantially compact column of particle-form contact material which comprises in combination: a substantially vertical conversion vessel adapted to confine a substantially compact column of contact material and a gaseous material, means to introduce particle-form contact material into the upper section of said vessel, means to introduce fluid hydrocarbon reactant into said vessel, a partition positioned across said vessel within the lower section thereof, said partition having a plurality of orifices therein spaced substantially uniformly across its horizontal cross-sectional area, a tube fitted tightly in each of said orifices and terminating a short distance below said partition, a plurality of secondary tubes positioned vertically in said vessel a spaced distance below said partition, one of said tubes being positioned symmetrically below each one of said first tubes, each of said secondary tubes being of substantially greater horizontal dimensions at least for its upper end than the first tube with which it is associated and the upper end of said secondary tube terminating near the lower end of the first tube, a third plurality of tubes depending from the underside of said partition of substantially greater horizontal dimensions than said second tubes and terminating short of the lower ends of said second tubes, one of said third tubes being positioned concentrically with respect to each one of said second tubes, a conduit connecting into the shell of said vessel below said partition but above the lower ends of said second tubes and means to withdraw contact material from the vessel at a level below the lower ends of said second tubes substantially uniformly from all portions of the horizontal cross-sectional area of said vessel, and flow throttle means associated with said withdrawal means.

10. The method for conversion of fluid hydrocarbons in the presence of a particle-form solid contact material which comprises: introducing particle-form contact material at a temperature suitable for said hydrocarbon conversion into the upper section of a confined conversion zone and passing it downwardly within said zone as a substantially compact column, passing said contact material from the lower section of said conversion zone as a plurality of spaced substantially compact streams downwardly into a confined separation zone, expanding the cross-sectional size of said streams in the upper section of said separation zone, flowing the contact material from the locations of expansion in said streams as substantially compact confined, spaced streams downwardly onto the surface of a substantially compact bed of said contact material maintained at the bottom of said separation zone a substantial vertical distance below said locations of expansion so as to provide a gas space surrounding said confined streams above said bed, withdrawing used contact material from said bed, introducing a fluid hydrocarbon charge into said conversion zone and passing said charge downwardly within said column to effect conversion of said hydrocarbon charge, withdrawing conversion products in the gaseous phase from said conversion zone by passing said products downwardly through said plurality of spaced streams of contact material into the upper section of said separation zone, upwardly disengaging said gaseous products from said contact material in each of said streams substantially at the location of its expansion in size, directing the disengaged gaseous products downwardly within said gas space within said separation zone so as to encourage settling of entrained solid particles onto said bed and withdrawing said conversion products in the gaseous phase from said gas space substantially separately of the contact material.

11. In a gas-solid contacting vessel wherein gaseous material is contacted with a substantially compact bed of particle-form solid contact material the improved means for separate withdrawal of said gas from under the surface of said bed in said contacting vessel which comprises in combination: means defining a partition across said vessel in the portion thereof occupied by said bed, a plurality of uniformly spaced openings in said partition for passage of solid material to a level below said partition, a plurality of spaced, substantially vertical conduits positioned within said vessel, one conduit being spaced a short distance below each of said openings, each conduit being a substantially greater horizontal dimension in all directions at least on its open upper end than the opening in said partition thereabove so as to provide a location for gas disengagement from solids at the upper ends of said conduits and each conduit terminating at a level substantially below said partition but above the lower end of said vessel so as to provide a settling space in the portion of the vessel immediately below said partition and between said conduits, baffle means adjacent the upper ends of said conduits adapted to direct the flow of disengaged gas downwardly within said settling space, and conduit means for gas withdrawal to the outside of said vessel connected into said vessel at a level below said partition and above the lower ends of said first named conduits.

ERIC V. BERGSTROM.

REFERENCES CITED

The following references are of record in the file of this patent:

UNITED STATES PATENTS

| Number | Name | Date |
|---|---|---|
| 2,264,438 | Gaylor | Dec. 2, 1941 |
| 2,312,006 | Thiele | Feb. 23, 1943 |